United States Patent
Bai et al.

(10) Patent No.: US 8,139,612 B2
(45) Date of Patent: Mar. 20, 2012

(54) METHODS AND APPARATUS FOR DYNAMIC PACKET MAPPING

(75) Inventors: Jinxia Bai, San Diego, CA (US); Chinnappa K. Ganapathy, San Diego, CA (US); Thomas Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 11/398,156

(22) Filed: Apr. 4, 2006

(65) Prior Publication Data

US 2007/0230490 A1    Oct. 4, 2007

(51) Int. Cl.
  *H04J 13/00*  (2011.01)
  *H04J 9/00*   (2006.01)
  *H04J 11/00*  (2006.01)
  *H04J 1/00*   (2006.01)

(52) U.S. Cl. ......... 370/479; 370/204; 370/206; 370/484
(58) Field of Classification Search .................... 370/474
  See application file for complete search history.

(56) References Cited

U.S. PATENT DOCUMENTS

| | | | |
|---|---|---|---|
| 5,870,628 | A |   | 2/1999 | Chen et al. |
| 5,917,812 | A | * | 6/1999 | Antonio et al. ............... 370/337 |
| 6,067,330 | A |   | 5/2000 | Usui |
| 6,252,917 | B1 | * | 6/2001 | Freeman ....................... 375/340 |
| 6,381,728 | B1 | * | 4/2002 | Kang ............................. 714/781 |
| 6,624,767 | B1 | * | 9/2003 | Shiu et al. ...................... 341/81 |
| 6,668,350 | B1 | * | 12/2003 | Kim ............................... 714/759 |
| 6,728,803 | B1 | * | 4/2004 | Nelson et al. .................. 710/60 |
| 6,754,217 | B1 | * | 6/2004 | Ahn ............................. 370/395.6 |
| 6,781,992 | B1 | * | 8/2004 | Rana et al. ..................... 370/394 |
| 6,788,652 | B1 | * | 9/2004 | Hwang .......................... 370/282 |
| 7,075,936 | B2 | * | 7/2006 | Hathaway et al. ....... 370/395.64 |
| 7,171,110 | B1 |   | 1/2007 | Wilshire |
| 7,254,112 | B2 | * | 8/2007 | Cornet et al. ................. 370/230 |
| 7,302,620 | B2 | * | 11/2007 | Kim ............................. 714/701 |

(Continued)

FOREIGN PATENT DOCUMENTS

CN    1523769 A    8/2004

(Continued)

OTHER PUBLICATIONS

International Search Report—PCT/US07/065985, International Search Authority—European Patent Office—Sep. 25, 2007.

(Continued)

*Primary Examiner* — Kevin C Harper
*Assistant Examiner* — Cassandra Decker
(74) *Attorney, Agent, or Firm* — Ryan Farr

(57) ABSTRACT

Methods and apparatus for dynamic packet mapping. A method is provided for mapping metric data to produce a decodable packet associated with a channel. The method includes obtaining a channel identifier associated with metric data, determining an available buffer from a plurality of buffers based on the channel identifier, writing the metric data to the available buffer, detecting when a decodable packet is formed in a selected buffer of the plurality of buffers, and outputting the decodable packet from the selected buffer. An apparatus includes a plurality of buffers and mapping logic that is configured to obtain a channel identifier associated with metric data, determine an available buffer based on the channel identifier, write the metric data to the available buffer, detect when a decodable packet is formed in a selected buffer, and output the decodable packet from the selected buffer.

25 Claims, 6 Drawing Sheets

U.S. PATENT DOCUMENTS

| | | | |
|---|---|---|---|
| 7,349,462 B2 | 3/2008 | Schott et al. | |
| 7,386,057 B2 | 6/2008 | Ito et al. | |
| 7,409,606 B2* | 8/2008 | Nakai | 714/701 |
| 7,433,946 B2* | 10/2008 | Shen et al. | 709/223 |
| 7,555,071 B2 | 6/2009 | Sontowski | |
| 7,653,153 B2 | 1/2010 | Tosato et al. | |
| 2002/0015425 A1* | 2/2002 | Fujii | 370/535 |
| 2003/0041218 A1* | 2/2003 | Kataria | 711/156 |
| 2003/0137936 A1 | 7/2003 | Cornet et al. | |
| 2004/0117716 A1* | 6/2004 | Shen | 714/776 |
| 2004/0248002 A1* | 12/2004 | Asahina et al. | 429/181 |
| 2005/0052991 A1 | 3/2005 | Kadous | |
| 2005/0068918 A1* | 3/2005 | Mantravadi et al. | 370/328 |
| 2005/0117891 A1 | 6/2005 | Suzuki | |
| 2005/0190864 A1* | 9/2005 | Pan et al. | 375/320 |
| 2005/0283705 A1 | 12/2005 | McNamara | |
| 2006/0045169 A1 | 3/2006 | Kim | |
| 2006/0156163 A1* | 7/2006 | Berens et al. | 714/748 |
| 2006/0193290 A1* | 8/2006 | Suzuki et al. | 370/329 |
| 2006/0198454 A1 | 9/2006 | Chung et al. | |
| 2007/0050694 A1* | 3/2007 | Bickerstaff et al. | 714/752 |
| 2007/0110065 A1 | 5/2007 | Rodgers et al. | |
| 2007/0248002 A1* | 10/2007 | Kim et al. | 370/207 |
| 2007/0271492 A1* | 11/2007 | Yahata et al. | 714/755 |
| 2008/0195913 A1* | 8/2008 | Bates et al. | 714/752 |

FOREIGN PATENT DOCUMENTS

| | | |
|---|---|---|
| CN | 1627416 A | 6/2005 |
| EP | 1511318 | 3/2005 |
| EP | 1267511 | 1/2008 |
| GB | 2388760 | 11/2003 |
| JP | 10051495 A | 2/1998 |
| JP | 11298437 A | 10/1999 |
| JP | 2002052770 A | 2/2002 |
| JP | 2005167420 A | 6/2005 |
| JP | 2005323173 A | 11/2005 |
| TW | I234949 | 6/2005 |
| TW | I234950 | 6/2005 |
| TW | I235560 | 7/2005 |
| WO | WO 2006019102 A1 * | 2/2006 |
| WO | WO2006020123 A2 | 2/2006 |

OTHER PUBLICATIONS

Written Opinion—PCT/US07/065985, International Search Authority—European Patent Office—Sep. 25, 2007.

Yuan Chi et al., "A Novel Burst Assembly Algorithm for OBS networks-Based on Data-length Time-lag Product," Asia-Pacific Conference on Communications, 2005, pp. 319-323.

* cited by examiner

| Mode | Meaning | Turbo packet length | Slot per turbo packet | Buffer memory address reset value | Slot read start point |
|---|---|---|---|---|---|
| 0 | QPSK, rate 1/3 | 3000 | 3 | 0, 1000, 2000 | 0 |
| 1 | QPSK, rate 1/2 | 2000 | 2 | 0, 1000 | 0 |
| 2 | 16-QAM, rate 1/3 | 3000 | 1.5 | 0, 1000, 2000 | 0, 2/4 |
| 3 | 16-QAM, rate 1/2 | 2000 | 1 | 0 | 0 |
| 4 | 16-QAM, rate 2/3 | 1500 | 0.75 | 0, 500, 1000 | 0, 1/4, 2/4, 3/4 |
| 5 | OIS QPSK, rate 1/5 | 5000 | 5 | 0, 1000, 2000, 3000, 4000 | 0 |
| 6 | L-QPSK, rate 1/3, ratio--4 | 3000 | 3 | 0, 1000, 2000 | 0 |
| 7 | L-QPSK, rate ½, ratio--4 | 2000 | 2 | 0, 1000 | 0 |
| 8 | L-QPSK, rate 2/3, ratio--4 | 1500 | 1.5 | 0, 500, 1000 | 0, 2/4 |
| 9 | L-QPSK, rate 1/3, ratio-6.25 | 3000 | 3 | 0, 1000, 2000 | 0 |
| 10 | L-QPSK, rate ½, ratio-6.25 | 2000 | 2 | 0, 1000 | 0 |
| 11 | L-QPSK, rate 2/3, ratio-6.25 | 1500 | 1.5 | 0, 1000, 2000 | 0, 2/4 |

METHODS AND APPARATUS FOR DYNAMIC PACKET MAPPING

CROSS REFERENCE TO RELATED APPLICATIONS

The present Application for Patent is related to co-pending U.S. patent application Ser. No. 11/398,205, entitled: "METHODS AND APPARATUS FOR DYNAMIC PACKET REORDERING" by same inventors, filed concurrently herewith, assigned to the assignee hereof, and expressly incorporated by reference herein.

BACKGROUND

1. Field

The present application relates generally to the distribution of data over a data network, and more particularly, to methods and apparatus for dynamic packet mapping.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to be delivered over a distribution network.

Typically, data representing one or more services is rate adjusted and processed using one or more error correction techniques. For example, the data may be turbo encoded, bit interleaved, and then divided into slots that are bit scrambled. Additionally, constellation mapping and symbol interleaving may be performed. Finally, the data may be mapped into interlaces to form an OFDM symbol.

At a receiving device, the above processes need to be reversed in order to obtain data packets that can be decoded to recover the transmitted services. This requires that detected packets be mapped so that they can be associated with the appropriate logical channel. Unfortunately, conventional systems may reverse the above processes in a step by step manner utilizing intermediate memories. This is especially true of the mapping process in which the size of the memories may greatly increase based on the number of logical channels thereby increasing processing latencies.

Therefore what is needed is a system to process data in a received transmission frame so that decodable packets for each logical channel can be obtained in a memory efficient manner, thereby minimizing processing latencies.

SUMMARY

In one or more embodiments, a mapping system, comprising methods and apparatus, is provided that operates to provide dynamic packet mapping. For example, in an aspect, the system operates to dynamically map received modulation symbols into decodable packets for different logical channels. The decodable packets are used to recover services transmitted over a distribution network. The system comprises a memory efficient implementation that utilizes small buffer sizes and therefore minimizes processing latencies.

In an aspect, a method is provided for mapping metric data to produce a decodable packet associated with a channel. The method comprises obtaining a channel identifier associated with metric data, and determining an available buffer from a plurality of buffers based on the channel identifier. The method also comprises writing the metric data to the available buffer, detecting when a decodable packet is formed in a selected buffer of the plurality of buffers, and outputting the decodable packet from the selected buffer.

In an aspect, an apparatus is provided for mapping metric data to produce a decodable packet associated with a channel. The apparatus comprises a plurality of buffers and mapping logic. The mapping logic is configured to obtain a channel identifier associated with metric data, determine an available buffer from the plurality of buffers based on the channel identifier, write the metric data to the available buffer, detect when a decodable packet is formed in a selected buffer of the plurality of buffers, and output the decodable packet from the selected buffer In an aspect, an apparatus is provided for mapping metric data to produce a decodable packet associated with a channel. The apparatus comprises means for obtaining a channel identifier associated with metric data, and means for determining an available buffer from a plurality of buffers based on the channel identifier. The apparatus also comprises means for writing the metric data to the available buffer, means for detecting when a decodable packet is formed in a selected buffer of the plurality of buffers, and means for outputting the decodable packet from the selected buffer.

In an aspect, a computer-readable medium is provided having a computer program comprising instructions, which when executed by at least one processor, operate to map metric data to produce a decodable packet associated with a channel. The computer program comprises instructions for obtaining a channel identifier associated with metric data, and instructions for determining an available buffer from a plurality of buffers based on the channel identifier. The computer program also comprises instructions for writing the metric data to the available buffer, instructions for detecting when a decodable packet is formed in a selected buffer of the plurality of buffers, and instructions for outputting the decodable packet from the selected buffer.

In an aspect, at least one processor is provided that is configured to perform a method for mapping metric data to produce a decodable packet associated with a channel. The method comprises obtaining a channel identifier associated with metric data, determining an available buffer from a plurality of buffers based on the channel identifier. The method also comprises writing the metric data to the available buffer, detecting when a decodable packet is formed in a selected buffer of the plurality of buffers, and outputting the decodable packet from the selected buffer.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

In one or more embodiments, a mapping system is provided that operates to provide dynamic "on-the-fly" mapping of data received in a transmission frame into decodable packets associated with one or more logical channels. For example, the transmission frame comprises multiplexed content flows in one or more logical channels having a particular arrangement, sequence, mixing, interleaving, scrambling, and/or other encoding of real-time and/or other than real-time services. The system operates to dynamically map the received data on-the-fly to produce decodable packet streams for each logical channel that can be decoded to obtain transmitted services. The mapping system comprises a memory efficient implementation and thereby minimizes processing latencies. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

For the purpose of this description, embodiments of a mapping system are described herein with reference to a communication network that utilizes Orthogonal Frequency Division Multiplexing (OFDM) to provide communications between a network server and one or more mobile devices. For example, in an embodiment of an OFDM system, a frame is defined that comprises time division multiplex (TDM) pilot signals, frequency division multiplex (FDM) pilot signals, overhead information symbols (OIS), and data symbols. The data symbols are used to transport services from the server to receiving devices. A data slot is defined as a set of 500 data symbols that occur over one OFDM symbol time. Additionally, an OFDM symbol time in the frame carries seven slots of data.

The following definitions are used herein to describe one or more embodiments of a mapping system.

Flow An element of a service, for example, a service may have two flows—an audio flow and a video flow.

Service A media content that can have one or more flows.

MLC A media logical channel ("channel") used for data or control information.

Overhead Information Symbols (OIS) Symbols in a frame that carry information about the location of various MLCs in the frame.

Slot The smallest unit of bandwidth allocated to a MLC over an OFDM symbol.

Figure 1:
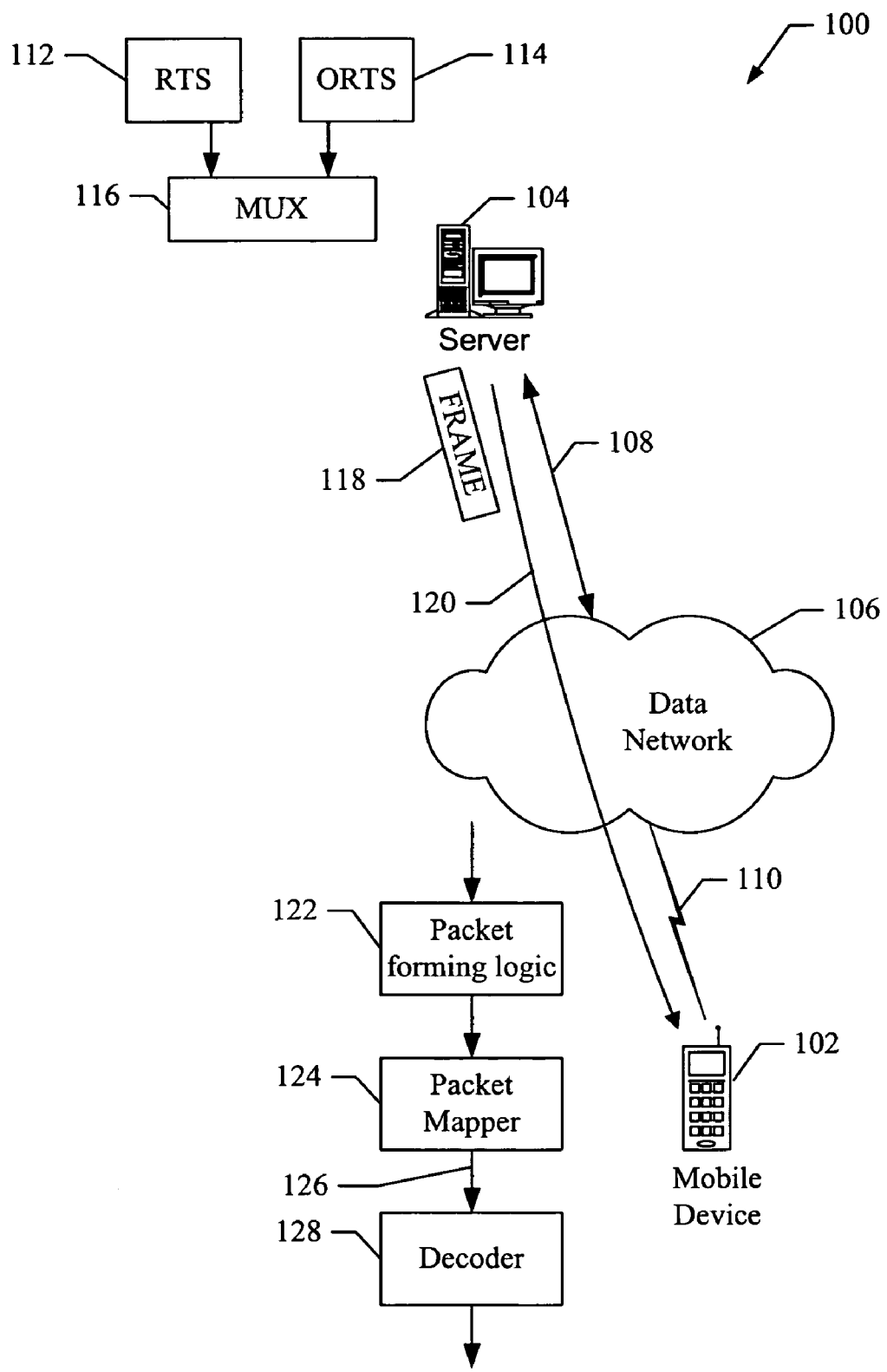
FIG. 1 shows a network that comprises an embodiment of a mapping system.

FIG. 1 shows a network 100 that comprises an embodiment of a mapping system. The network 100 comprises a mobile device 102, a server 104, and a data network 106. For the purpose of this description, it will be assumed that the data network 106 operates to provide communications between the server 104 and one or more portable devices using OFDM technology; however, embodiments of the mapping system are suitable for use with other transmission technologies as well.

In an embodiment, the server 104 operates to provide services that may be subscribed to by devices in communication with the network 106. The server 104 is coupled to the network 106 through the communication link 108. The communication link 108 comprises any suitable communication link, such as a wired and/or wireless link that operates to allow the server 104 to communicate with the network 106. The network 106 comprises any combination of wired and/or wireless networks that allows services to be delivered from the server 104 to devices in communication with the network 106, such as the device 102.

It should be noted that the network 106 may communicate with any number and/or types of portable devices within the scope of the embodiments. For example, other devices suitable for use with the mapping system include, but are not limited to, a personal digital assistant (PDA), email device, pager, a notebook computer, mp3 player, video player, or a desktop computer. The wireless link 110 comprises a wireless communication link based on OFDM technology; however, in other embodiments the wireless link may comprise any suitable wireless technology that operates to allow devices to communicate with the network 106.

The device 102 in this embodiment comprises a mobile telephone that communicates with the network 106 through the wireless link 110. The device 102 takes part in an activation process that allows the device 102 to subscribe to receive services over the network 106. The activation process may be performed with the server 104; however, the activation process may also be performed with some other server, service provider, content retailer, or other network entity not shown. For the purpose of this description, it will be assumed that the device 102 performs the activation process with the server 104 and is now ready to subscribe and receive services from the server 104.

The server 104 comprises content that includes one or more real time services (RTS) 112, and/or one or more "other than real time services" (ORTS) 114. For example, the services (112, 114) comprise multimedia content that includes news, sports, weather, financial information, movies, and/or applications, programs, scripts, clips, or any other type of suitable content or service. Thus, the services (112, 120) may comprise video, audio or other information formatted in any suitable format. The server 104 also comprises a multiplexer (MUX) 116 that operates to multiplex logical channels comprising one or more of the services (112, 114) into a transmission frame 118 for transmission over the network 106 to the device 102, as shown by the path 120. During the generation of the transmission frame 118, data representing the services (112, 114) may be encoded, rate adjusted, interleaved, scrambled, or otherwise processed so as be transmitted in a bandwidth efficient manner that is resistant to transmission errors.

The device 102 receives the transmission frame 118 and utilizes packet forming logic 122 to process slot data obtained from the frame 118 to generate metric data. For example, the packet forming logic 122 may operate to de-interleave, descramble, rate adjust, or perform any other process to convert the received slot data into the metric data.

In an embodiment, the device 102 comprises a packet mapper 124 that operates to receive the metric data from the packet forming logic 122 and map the metric data in an efficient manner into decodable packets 126 that represent the transmitted services in one or more logical channels. For example, the packet mapper 122 comprises a memory efficient implementation that minimizes processing latencies. A more detailed description of the packet mapper 124 is provided in another section of this document. The decodable packets 126 are input to a decoder 128 that operates to decode the decodable packets to obtain the transmitted services (112, 114) in each logical channel.

Therefore, embodiments of a mapping system operate to efficiently map metric data to produce decodable packets that can be decoded to recover logical channels comprising one or more RTS and/or ORTS services. It should be noted that the mapping system is not limited to the implementations described with reference to FIG. 1, and that other implementations are possible within the scope of the embodiments.

Figures 2, 3:
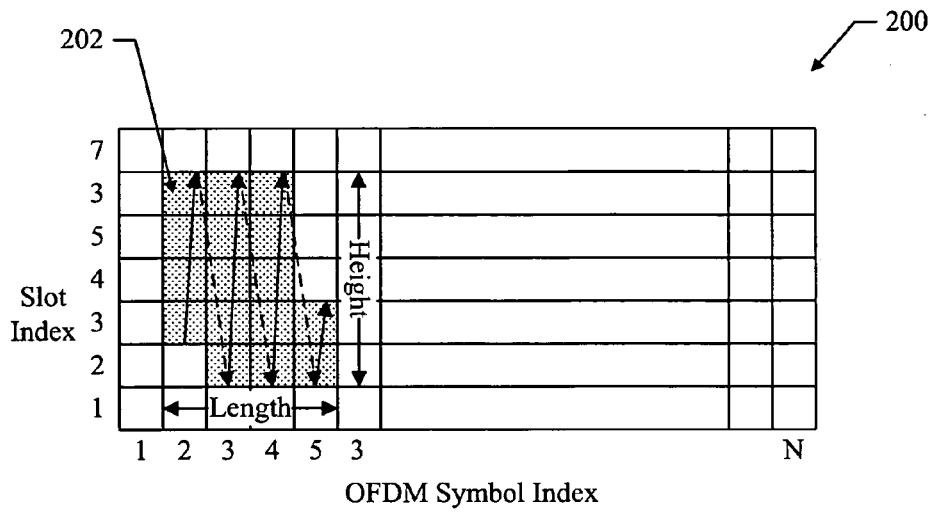
FIG. 2 shows an embodiment of a frame that illustrates OFDM slots and slot allocation for a logical channel for use in a mapping system.
FIG. 3 shows an embodiment of a modulation table for use in a mapping system.

FIG. 2 shows an embodiment of a frame 200 that illustrates OFDM data slots and slot allocation for a logical channel for use in a mapping system. The frame 200 comprises "N" OFDM symbols each having seven (7) data slots. A slot allocation for a logical channel is shown generally by the shaded region at 202. Two variables are used to describe the slot allocation, namely; length and height. The length is in OFDM symbols and the height is in slots.

FIG. 3 shows an embodiment of a modulation table 300 for use in a mapping system. The modulation table comprises a mode indicator 302, a meaning descriptor 304, packet length indicator 306, slot per packet indicator 308, memory reset address indicator 310, and read start pointer 312. The modulation table 300 provides information relating to various data modes in which data may be formatted. As shown in the table 300, the data may be formatted in a quadrature phase shift keying (QPSK) or quadrature amplitude modulation (QAM) format. Each of the twelve modes 302 has an associated turbo packet length 306 and slot per turbo packet 308 allocations. The parameters in the table 300 are use by various portions of a mapping system to produce decodable packets associated with one or more logical channels. It should be noted that embodiments of the mapping system operate to satisfy the constraints of all twelve modes 302 on-the-fly to produce the decodable packets.

Figure 4:
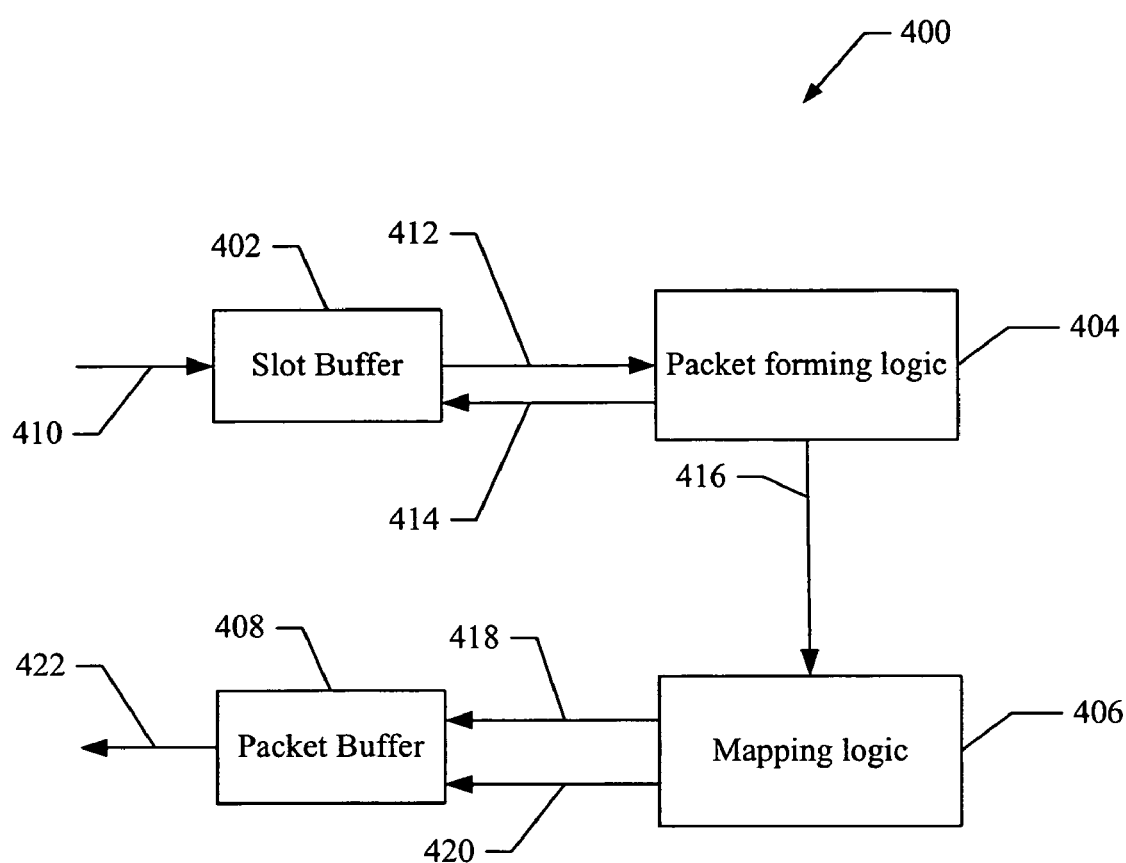
FIG. 4 shows an embodiment of a mapping system.

FIG. 4 shows an embodiment of a mapping system 400. The mapping system comprises a slot buffer 402, packet forming logic 404, mapping logic 406 and packet buffer 408. It should be noted that the mapping system 400 represents just one implementation and that other implementations are possible within the scope of the embodiments. For example, the functions of the mapping system 400 may be implemented by one or more processors configured to execute a computer program.

The slot buffer 402 comprises any suitable memory operable to store received slot data. For example, transmission frames are received and processed by physical layer receiving logic (not shown) to produces the slot data 410. The slot data 410 is stored in the slot buffer 402.

The packet forming logic 404 comprises a CPU, processor, gate array, hardware logic, virtual machine, software, and/or any combination of hardware and software. The packet forming logic 404 is configured to receive slot data 412 from the slot buffer 402. The packet forming logic 404 then operates to perform any suitable process on the slot data 412 to form metric data 416. For example, the packet forming logic 404 operates to de-interleave, descramble, rate adjust, or perform any other process on the slot data 412 to produce the metric data 416. In an embodiment, the metric data 416 comprises log likelihood ratio (LLR) metrics.

In an embodiment, the packet forming logic 404 operates to process the slot data to produce the LLR metrics as 6-bit values determined from the following expression.

$$LLR_n = \min_{G(S) \cdot b_n = 1} \frac{|r - cG(S)|^2}{N_0} - \min_{G(S) \cdot b_n = 0} \frac{|r - cG(S)|^2}{N_0}$$

where $b_n$ are binary symbols, S is a group of binary symbols, G(S) represents a Gray mapping of S, r is received signal, c is the lumped (complex) channel gain, and $N_0$ is the noise variance of a zero mean white complex Gaussian noise process.

One suitable implementation of the packet forming logic 404 that operates to produce LLR metrics can be found in application 11/398,205 cross-referenced above The mapping logic 406 comprises a CPU, processor, gate array, hardware logic, virtual machine, software, and/or any combination of hardware and software. The mapping logic 406 operates to provide read/write control signals 420 to write the metric data 416 into the packet buffer 408 (as shown at 418) so that decodable turbo packets 422 associated with one or more logic channels can be read out of the packet buffer 408, as shown at 422.

The packet buffer 408 comprises a memory or storage device configured to store the metric data 418 and read-out the decodable packets 422. In an embodiment, the packet buffer 408 comprises multiple buffers that are accessed in a round-robin technique by the mapping logic 406 to provide an efficient mapping system.

During operation, the mapping logic 406 operates to determine when slot data is ready to be processed by the packet forming logic 404. For example, the slot buffer 402 outputs a slot ready (slot_rdy) indicator when slot data is ready. The slot data is processed by the packet forming logic 404 to produce metric data 416. The mapping logic 406 operates to generate read and write addresses to the packet buffer 408 so that the metric data 416 can be written into the packet buffer 408 (as shown at 418) at selected locations. The mapping logic 406 also provides read addresses so that the decodable packets 422 associated with one or more logical channels can be read out of the packet buffer 408. The mapping logic 406 utilizes the packet buffer 408 in a memory efficient manner so that processing latencies are minimized. More detailed descriptions of the mapping logic 406 and packet buffer 408 are provided in another section of this document.

In an embodiment, the mapping system comprises a computer program having one or more program instructions ("instructions") stored on a computer-readable medium, which when executed by at least one processor, for instance, a processor at the mapping logic 406, provides the functions of the mapping system described herein. For example, instructions may be loaded into the mapping logic 406 from a computer-readable medium, such as a floppy disk, CDROM, memory card, FLASH memory device, RAM, ROM, or any other type of memory device or computer-readable medium that interfaces to the mapping logic 406. In another embodiment, the instructions may be downloaded into the mapping logic 406 from an external device or network resource that interfaces to the mapping logic 406. The instructions, when executed by processing logic operate to provide embodiments of a mapping system as described herein.

Thus, the mapping system 400 operates to efficiently map metric data 416 to produce decodable packets associated with one or more logical channels in a way that minimizes processing latencies. It should be noted that the mapping system 400 is just one implementation and that other implementations are possible within the scope of the embodiments.

Figure 5:
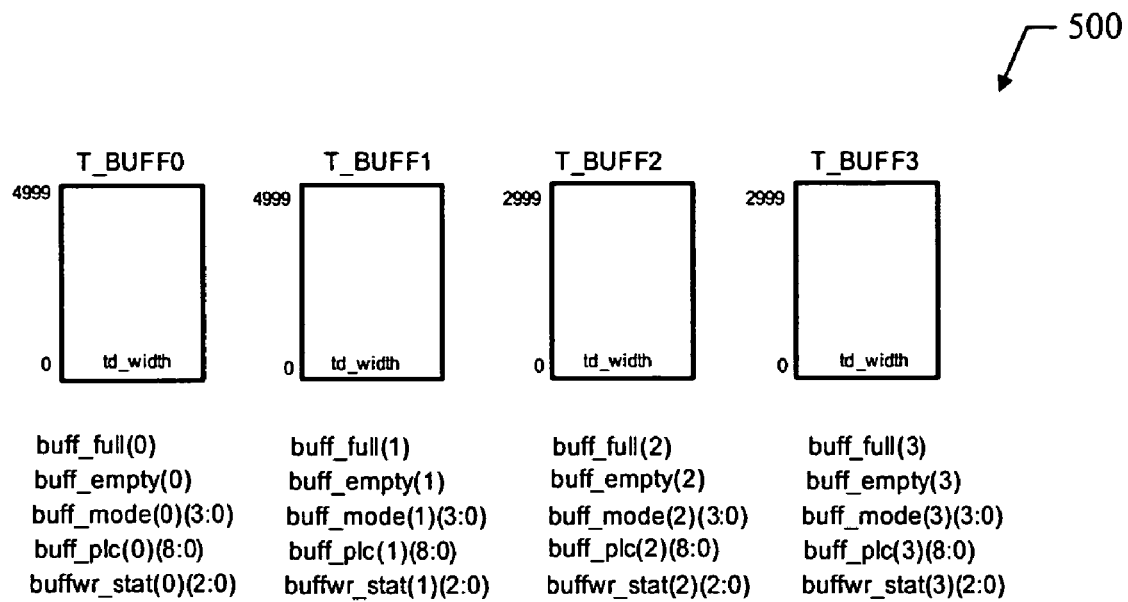
FIG. 5 shows an embodiment of a packet buffer for use in a mapping system.

FIG. 5 shows an embodiment of a packet buffer 500 for use in a mapping system. For example, the packet buffer 500 is suitable for use as the packet buffer 408 shown in FIG. 4. For clarity, aspects of the packet buffer 500 will be described with reference to FIG. 4.

In an embodiment, the packet buffer 500 comprises multiple turbo buffers (T_BUFF0, T_BUFF1, T_BUFF2, T_BUFF3). The number of T_BUFF buffers used depends on how many logical channels a receiver would like to handle simultaneously. The T_BUFF buffer sizes are variable (i.e., do not have to be the same) and depend on the transmitting pattern (i.e., number of logical channels, data modes, etc.). Preferably, the T_BUFF buffer size should be at least equal to the longest packet size. The received data is read out from the slot buffer 402 and goes through a packet forming process provided by the packet forming logic 404 to produce the metric data 416. The mapping logic 406 then operates to write the metric data 416 into the T_BUFF buffers using a round-robin technique. In a parallel process, the mapping logic 406 also reads the T_BUFF buffers using a round-robin technique so that decodable packets 422 associated with each logical channel can be read out of the T_BUFF buffers and input to decoding logic. The following example illustrates the operation of an embodiment of the mapping system.

Processing Four Channels with All Twelve Modes

The following provides a description of how the mapping system operates to process four MLCs having all twelve data modes (i.e., modes 302 shown in Table 300). To process four MLCs simultaneously, four T_BUFF buffers are used as follows.

1. Two 5000 deep memory buffers (T_BUFF0, T_BUFF1)
2. Two 3000 deep memory buffers (T_BUFF2, T_BUFF3)

The two 5000 deep memory buffers are used for data mode 5, which is generally used for OIS data. All four T_BUFF buffers are used for all other data modes. The turbo packet length varies with different data modes, as shown at 306 in Table 300. The worst-case memory requirement occurs in data mode 0 with QPSK—rate 1/3, which has a memory requirement of 3000 deep (note that for OIS data, only the first two buffers are used).

There are several flags and status registers associated with each T_BUFF buffer. There are also several address registers for storing the starting point of each T_BUFF memory write as follows.

1. buff_full[i] when set (1), there is a full turbo packet in memory i.
2. buff_empty[i] when set (1), the turbo packet in memory i has been read out.
3. buff_mode[i] mode information of the turbo packet in memory i.
4. buff_plcid[i] MLC identifier of the turbo packet in memory i.
5. buffwr_stat[i] memory write status when new slot data comes in and having the following values.
   000—start from the beginning
   001—start from address 500
   010—start from address 1000
   011—start from address 2000
   100—start from address 3000 (mode5 only)
   101—start from address 4000 (mode5 only)
6. slot_stat slot reading status of the current slot from the slot buffer 402 and having the following values.
   00—whole slot and will be read from address 0
   01—3/4 slot and will be read from address 125
   10—2/4 slot and will be read from address 262 (address 260 to 261 is the tag information)
   11—1/4 slot and will be read from address 288

Round-Robin Operation

Figure 6:
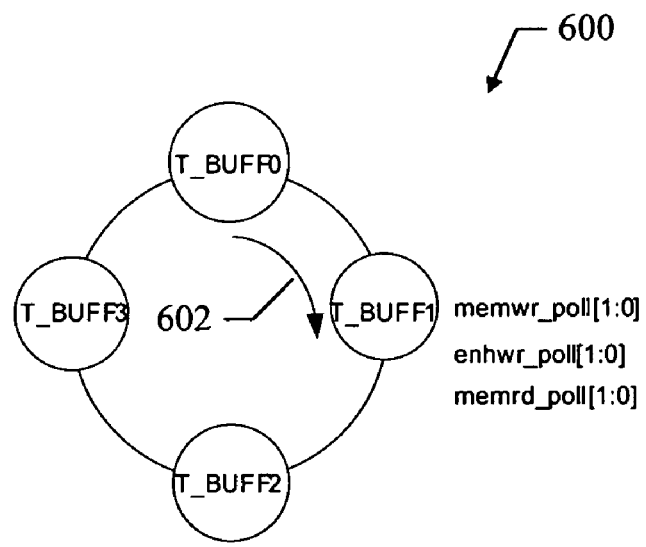
FIG. 6 shows a diagram that illustrates a round-robin memory access operation for use in a mapping system.

FIG. 6 shows a diagram 600 that illustrates a round-robin memory access technique for use in a mapping system. For example, reads and writes to the packet buffer 500 utilize an enhanced round-robin polling technique illustrated in the diagram 600 to poll each T_BUFF buffer in a clockwise fashion as shown by 602. In an embodiment, the memory read polling and the memory write polling operate independently. The following address pointers are used to provide polling of the packet buffer 500.

memwr_poll [1:0] Is a buffer memory write pointer that is frozen when it finds an empty T_BUFF memory available for filling with new metric data 418. Otherwise, it continuously polls until it finds a new empty memory slot.

enhwr_poll [1:0] Is a buffer memory enhancement layer write pointer that is used for layered modulation. It operates in a similar fashion as the memwr_poll [1:0] so that it will be frozen when it finds an empty T_BUFF memory available for filling with metric data 418. In layered modulation, two T_BUFF buffers are being written simultaneously, one for the base layer data and another for the enhancement layer. It should be noted that layered modulation may require that two T_BUFF buffers be available to start processing.

memrd_poll [1:0] Is a buffer memory read pointer that points to a 'full' T_BUFF memory from which decodable packets can be read out from to do turbo decoding. It continuously polls until it finds a new full T_BUFF and is frozen at the polling point where a new full T_BUFF is found.

In an embodiment, reading, writing and status conditions are implemented using the control signals 420. The mapping logic 410 operates to provide a mapping process by choosing a selected T_BUFF to write the metric data 418 into, and another T_BUFF to read decodable packets 422 out from. In an embodiment, the mapping logic 406 provides a round-robin polling algorithm to poll all the T_BUFFs to control the write and read operations to output the decodable packets 422.

Figure 7:
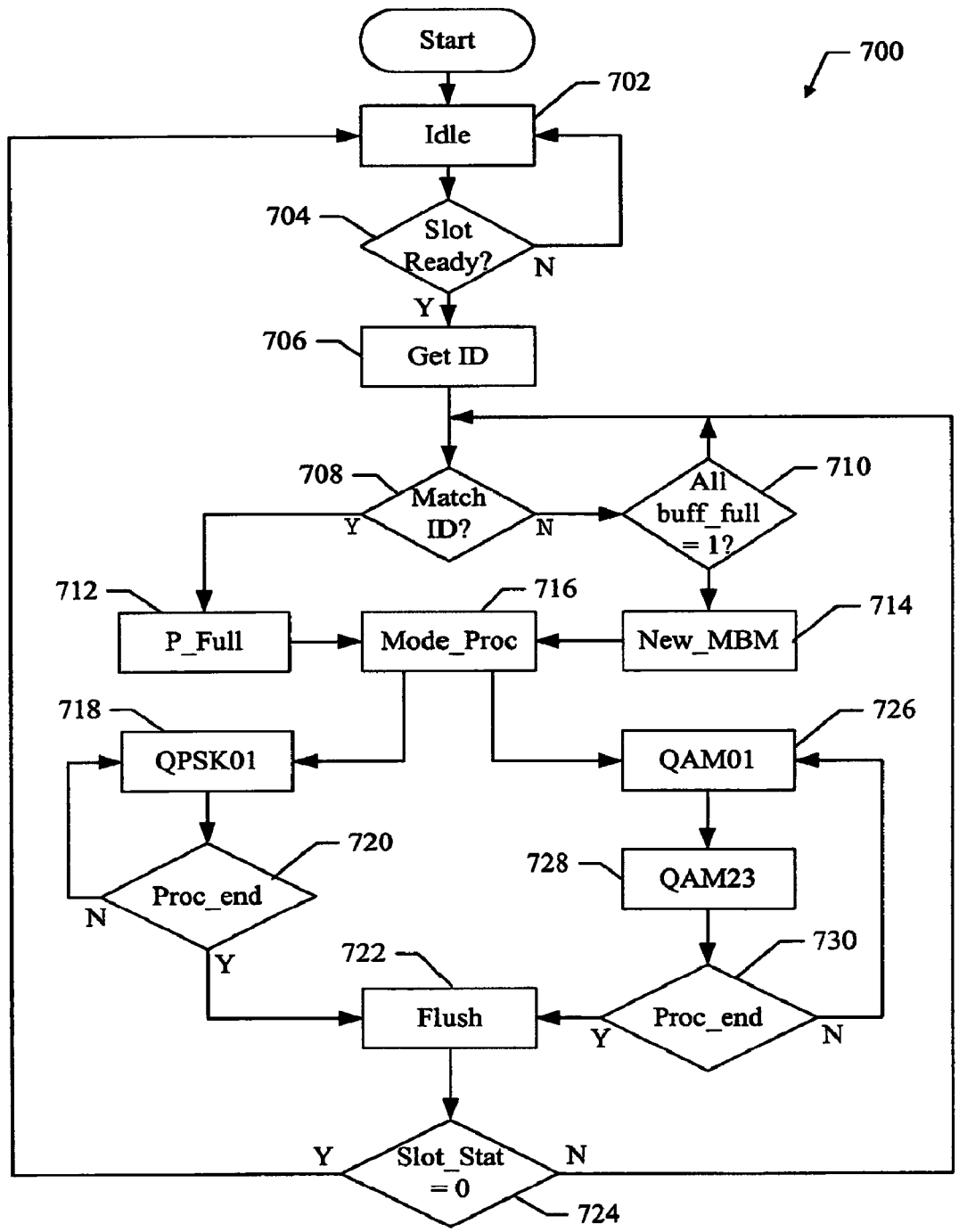
FIG. 7 shows an embodiment of a method for providing dynamic packet mapping for use in a mapping system.

FIG. 7 shows an embodiment of a method 700 for providing dynamic packet mapping for use in a mapping system. For the purpose of this description, it will be assumed that a number of T_BUFF buffers have been established, and that the mapping logic 406 operates to provide the functions of the method 700 as describe below.

At block 702, an idle state is entered. For example, after power up or after one full slot of data has been processed, the mapping logic 406 goes into an idle state.

At block 704, a test is performed to determine if new slot data is ready to be processed. For example, if there is slot data ready to be mapped, the slot_rdy flag is set to one.

At block 706, channel identifiers are obtained. For example, a MLC_ID, mode identifier, and/or other information associated with the slot data to be processed are obtained by the mapping logic 406.

At block 708, a test is performed to determine if the channel identifier associated with the slot data matches with a channel identifier associated with a partially filled T_BUFF buffer. If a match occurs, the method proceeds to block 712. If a match does not occur, the method proceeds to block 710. Thus, the partially filled T_BUFF buffer has a higher priority to be filled than an unfilled buffer.

At block 710, a test is performed to determine if there are any empty T_BUFF buffers. For example, if all the buff_full flags are set to one, then there are no empty T_BUFF buffers because all the T_BUFF buffers are either full or partially filled and the method proceeds to block 708. If there are empty buffers (i.e., a buff_full is not one), then the method proceeds to block 714.

At block 712, a start write address for the partially filled T_BUFF is determined based on the buffwr_stat[i] for that buffer. The mapping logic 406 operates to determine the start write address.

At block 716, mode information is used to determine a data mode for the slot data. For example, either QPSK or QAM processing is selected. An address counter (slotadr_cnt[8:0]) is used to generate the read address to slot buffer 402. It will be reset at the beginning of each slot and will increases every clock cycle (for tag reading or QPSK data), or every two cycle (for 16QAM data). The counter might also be reset at 0, 1/4, 2/4, or 3/4 of the slot length, depending on the slot_stat signal.

At block 718, writing QPSK slot data is performed. For example, the mapping logic 406 writes the metric data 418 to the designated T_BUFF buffer until either a full slot has been processed or a full turbo packet has been formed by using the partially filled T_BUFF buffer. The mapping logic 406 performs T_BUFF buffer writes based on the fact that the slot data is QPSK data.

At block 720, a test is performed to determine if QPSK processing is complete. The mapping logic 406 operates to determine if the QPSK processing is complete. If QPSK processing is complete, the method proceeds to block 722. If QPSK processing is not complete, the method returns to block 718.

At block 722, if necessary, a wait is performed to allow the system to complete any processing and set the slot_stat flag. For example, the end of the slot buffer 402 memory reading is not always at the end of the slot. It may end at 1/4, 2/4, 3/4, or at the end of the slot when the full turbo packet has been formed. The rest of the slot data in the slot buffer 402 will go to another turbo packet, and so in this case the slot_stat flag will be set to 1 to indicate there is more slot data to process. If there is no more slot data, the slot_stat flag will be set to zero.

At block 724 a test of the slot_stat is performed. If the whole slot has been processed, the slot_stat flag will be zero and the method proceeds to block 702 to wait for another slot of data to process. Otherwise the method will proceed to block 708 to form a new turbo packet with the remaining slot data.

At block 714, a start write address is set to zero to start a new T_BUFF write to an empty T_BUFF buffer. For example, the mapping logic 406 determines that the current packet to be mapped is not part of a channel associated with a partially filled T_BUFF buffer, and that there exists empty T_BUFF buffers. Thus, a start write address into an empty T_BUFF buffer is set to zero.

At block 726, writing QAM01 slot data is performed. For example, the mapping logic 406 writes the metric data 418 to the designated T_BUFF buffer until either a full slot has been processed or a full turbo packet has been formed by using the filled T_BUFF buffer. The mapping logic 406 performs T_BUFF buffer writes based on the fact that the slot data is QAM data.

At block 728, writing QAM23 slot data is performed in a fashion similar to block 726.

At block 730, a test is performed to determine if QAM processing is complete. If QAM processing is complete, the method proceeds to block 722. If QAM processing is not complete, the method returns to block 726.

In an embodiment, the mapping logic 406 operates to read out decodable packets associated with each logical channel by using the memrd_poll pointer and buff_full[i] flag. For example, the mapping logic 406 detects a buffer full condition by testing the buff_full flag. The memrd_poll pointer is then set to point to the correct address in the buffer. The mapping logic 406 proceeds in a round-robin fashion to detect full T_BUFF buffers, and when they are detected, to read out decodable packets. Therefore, as a result of the operation of the mapping system, the turbo packets 422 read out of the packet buffer 408 are in the correct order for each logical channel.

Thus, the mapping system provides dynamic packet mapping to generate a stream of decodable packets for one or more logical channels. It should be noted that the method 700 represents just one implementation and the changes, additions, deletions, combinations or other modifications of the method 700 are possible within the scope of the embodiments. It should also be noted that the mapping system described herein has no limitation at to the maximum number of MLCs that can be handled within one OFDM symbol.

Figure 8:
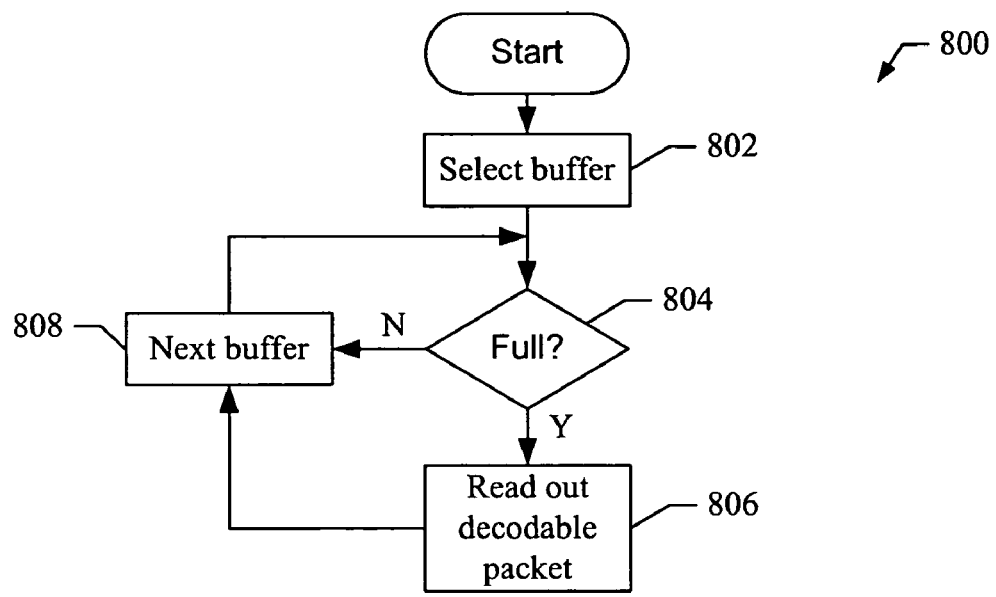
FIG. 8 shows an embodiment of a method for performing buffer reads to form a decodable packet stream for use in a mapping system.

FIG. 8 shows an embodiment of a method 800 for performing buffer reads to form a decodable packet stream for use in a mapping system. For example, the method 800 is provided by the mapping logic 406. Thus, the method 700 provides buffer writes and the method 800 provides buffer reads.

At block 802, a buffer is selected. For example, the packet buffer 408 comprises a plurality of T_BUFF buffers and the mapping logic 406 operates to select a T_BUFF buffer to test.

At block 804, a test is performed to determine if the selected buffer is full. For example, the mapping logic 406 determines if the selected buffer is full. In an embodiment, the mapping logic 406 tests the buff_full flag associated with the selected buffer. If the buff_full flag indicates that the buffer is full, the method proceeds to block 806. If the buff_full flag indicates that the buffer is not full, the method proceeds to block 808.

At block 806, a decodable packet is read out of the full buffer. For example, the mapping logic 406 begins reading the decodable packet from the full buffer at an address indicated by memrd_poll [1:0]. Thus, a decodable packet stream for each logical channel is output.

At block 808, a next buffer is selected to test. In an embodiment, the next buffer is selected using a round-robin technique that allows buffers to be selected in a circulating pattern. For example, the mapping logic 406 implements the round-robin technique. Once the next buffer is selected, the method proceeds to block 804.

Thus, the mapping system provides dynamic packet mapping to generate a stream of decodable packets for one or more logical channels. It should be noted that the method 800 represents just one implementation and the changes, additions, deletions, combinations or other modifications of the method 700 are possible within the scope of the embodiments.

Figure 9:
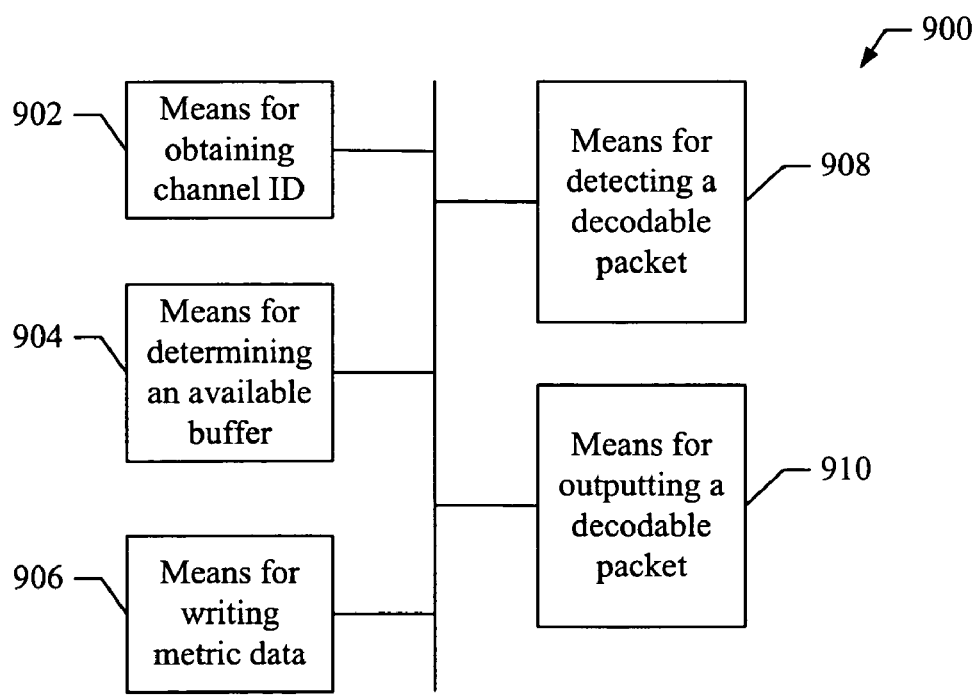
FIG. 9 shows an embodiment of a mapping system.

FIG. 9 shows an embodiment of a mapping system 900. The mapping system 900 comprises means (902) for obtaining a channel identifier, means (904) for determining an available buffer, means (906) for writing metric data, means (908) for detecting a decodable packet, and means (910) for outputting a decodable packet. In an embodiment, the means (902-910) are provided by one or more processors configured to execute a computer program to provide the functions of the mapping system described herein.

Therefore various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a mapping system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for mapping metric data to produce a decodable packet associated with a logical channel, the method comprising:
    iteratively filling a plurality of buffers equal in number to a number of logical channels to be handled simultaneously by:
        obtaining a data mode associated with the metric data, wherein the metric data results from processing a ready slot of data from a transmission frame and comprises log likelihood ratio (LLR) metrics, wherein an address counter is set at a beginning of each slot and used to generate a read address for the ready slot of data, the address counter being increased every predetermined number of clock cycles depending on the data mode;
        selecting an available buffer from the plurality of buffers, wherein the plurality of buffers are of various sizes to accommodate various packet sizes, with a largest buffer size being at least equal to a largest packet size, and the selection of an available buffer of a given size is dependent on the available buffer being at least equal in size to a size of the decodable packet associated with a transmitting pattern; and
        writing the metric data to the selected buffer; and emptying the plurality of buffers by:
        detecting when a decodable packet is formed in the selected buffer of the plurality of buffers, wherein the decodable packet is mapped from the metric data; and
        outputting the decodable packet from the selected buffer to decoding logic.

2. The method of claim 1, further comprising determining that the available buffer is a partially filled buffer associated with a channel identifier.

3. The method of claim 1, further comprising determining that the available buffer is an empty buffer.

4. The method of claim 1, further comprising determining the available buffer from the plurality of buffers using a round-robin technique.

5. The method of claim 1, further comprising detecting when the decodable packet is formed in the selected buffer of the plurality of buffers using a round-robin technique.

6. An apparatus for mapping metric data to produce a decodable packet associated with a logical channel, the apparatus comprising:
    a plurality of buffers equal in number to a number of logical channels to be handled simultaneously; and
    mapping logic configured to iteratively fill the plurality of buffers by being configured to obtain a data mode associated with the metric data wherein the metric data results from processing a ready slot of data from a transmission frame and comprises log likelihood ratio (LLR) metrics, wherein an address counter is set at a beginning of each slot, and used to generate a read address for the ready slot of data, the address counter being increased every predetermined number of clock cycles depending on the data mode;
    the mapping logic further configured to select an available buffer from the plurality of buffers, wherein the plurality of buffers are of various sizes to accommodate various packet sizes, with a largest buffer size being at least equal to a largest packet size, and the selection of an available buffer of a given size is dependent on the available buffer being at least equal in size to a size of the decodable packet associated with a transmitting pattern, and write the metric data to the selected buffer, and
    the mapping logic further configured to empty the plurality of buffers by being configured to detect when a decodable packet is formed in the selected buffer of the plurality of buffers, and output the decodable packet from the selected buffer to decoding logic.

7. The apparatus of claim 6, wherein the mapping logic is configured to determine that the available buffer is a partially filled buffer associated with a channel identifier.

8. The apparatus of claim 6, wherein the mapping logic is configured determine that the available buffer is an empty buffer.

9. The apparatus of claim 6, wherein the mapping logic is configured determine the available buffer from the plurality of buffers using a round-robin technique.

10. The apparatus of claim 6, wherein the mapping logic is configured to detect when the decodable packet is formed in the selected buffer of the plurality of buffers using a round-robin technique.

11. An apparatus for mapping metric data to produce a decodable packet associated with a logical channel, the apparatus comprising:
    means for iteratively filling a plurality of buffers equal in number to a number of logical channels to be handled simultaneously comprising:
        means for obtaining a data mode associated with the metric data, wherein the metric data results from processing a ready slot of data from a transmission frame and comprises log likelihood ratio (LLR) metrics, wherein an address counter is set at a beginning of each slot, and used to generate a read address for the ready slot of data, the address counter being increased a first number of clock cycles depending on the data mode;
        means for selecting an available buffer from the plurality of buffers, wherein the plurality of buffers are of various sizes to accommodate various packet sizes, with a largest buffer size being at least equal to a largest packet size, and the selection of an available buffer of a given size is dependent on the available buffer being at least equal in size to a size of the decodable packet associated with a transmitting pattern; and
        means for writing the metric data to the selected buffer; and means for emptying the plurality of buffers comprising:
            means for detecting when a decodable packet is formed in the selected buffer of the plurality of buffers, wherein the decodable packet is mapped from the metric data; and
            means for outputting the decodable packet from the selected buffer to decoding logic.

12. The apparatus of claim 11, further comprising means for determining that the available buffer is a partially filled buffer associated with a channel identifier.

13. The apparatus of claim 11, further comprising means for determining that the available buffer is an empty buffer.

14. The apparatus of claim 11, further comprising means for determining the available buffer from the plurality of buffers using a round-robin technique.

15. The apparatus of claim 11, wherein the means for detecting when the decodable packet is formed in the selected buffer of the plurality of buffers using a round-robin technique.

16. A non-transitory computer-readable medium having a computer program comprising instructions, which when executed by at least one processor, operate to map metric data to produce a decodable packet associated with a logical channel, the computer program comprising:
    instructions for iteratively filling a plurality of buffers equal in number to a number of logical channels to be handled simultaneously comprising:
        instructions for obtaining a data mode associated with the metric data, wherein the metric data results from processing a ready slot of data from a transmission frame and comprises log likelihood ratio (LLR) metrics, wherein an address counter is set at a beginning of each slot, and used to generate a read address for the ready slot of data, the address counter being increased every predetermined number of clock cycles depending on the data mode;
        instructions for selecting an available buffer from the plurality of buffers, wherein the plurality of buffers are of various sizes to accommodate various packet sizes, with a largest buffer size being at least equal to a largest packet size, and the selection of an available buffer of a given size is dependent on the available buffer being at least equal in size to a size of the decodable packet associated with a transmitting pattern; and
        instructions for writing the metric data to the selected buffer; and instructions for emptying the plurality of buffers comprising:
            instructions for detecting when a decodable packet is formed in the selected buffer of the plurality of buffers, wherein the decodable packet is mapped from the metric data; and
            instructions for outputting the decodable packet from the selected buffer to decoding logic.

17. The computer-readable medium of claim 16, wherein the computer program further comprises instructions for determining that the available buffer is a partially filled buffer associated with a channel identifier.

18. The computer-readable medium of claim 16, wherein the computer program further comprises instructions for determining that the available buffer is an empty buffer.

19. The computer-readable medium of claim 16, wherein the computer program further comprises instructions for determining the available buffer from the plurality of buffers using a round-robin technique.

20. The computer-readable medium of claim 16, wherein the instructions for detecting when the decodable packet is formed in the selected buffer of the plurality of buffers use a round-robin technique.

21. An apparatus for mapping metric data to produce a decodable packet associated with a logical channel, the apparatus comprising:
    a plurality of buffers equal in number to a number of logical channels to be handled simultaneously;
    a memory; and
    a processor coupled with the memory and the plurality of buffers, wherein the memory stores software codes comprising instructions implemented by the processor to iteratively fill the plurality of buffers using instructions to
        a) obtain a data mode associated with the metric data, wherein the metric data results from processing a ready slot of data from a transmission frame and comprises log likelihood ratio (LLR) metrics, wherein an address counter is set at a beginning of each slot, and used to generate a read address for the ready slot of data, the address counter being increased every predetermined number of clock cycles depending on the data mode;
        b) select an available buffer from the plurality of buffers, wherein the plurality of buffers are of various sizes to accommodate various packet sizes, with a largest buffer size being at least equal to a largest packet size, and the selection of an available buffer of a given size is dependent on the available buffer being at least equal in size to a size of the decodable packet associated with a transmitting pattern; and
        c) write the metric data to the selected buffer; and
    wherein the memory further stores software codes comprising instructions implemented by the processor to empty the plurality of buffers using instructions to
        d) detect when a decodable packet is formed in the selected buffer of the plurality of buffers, wherein the decodable packet is mapped from the metric data; and e) output the decodable packet from the selected buffer to decoding logic.

22. The apparatus of claim 21, wherein the software codes further comprise instructions implemented by the processor to determine that the available buffer is a partially filled buffer associated with a channel identifier.

23. The apparatus of claim 21, wherein the software codes further comprise instructions implemented by the processor to determine that the available buffer is an empty buffer.

24. The apparatus of claim 21, wherein the software codes further comprise instructions implemented by the processor to determine the available buffer from the plurality of buffers using a round-robin technique.

25. The apparatus of claim 21, wherein the instructions to detect when the decodable packet is formed in the selected buffer of the plurality of buffers use a round-robin technique.

* * * * *